(12) United States Patent
Monahan et al.

(10) Patent No.: US 7,359,005 B2
(45) Date of Patent: Apr. 15, 2008

(54) METHOD AND SYSTEM FOR COMPONENT SYNC DETECTION AND ALIGNMENT

(75) Inventors: Charles Monahan, Mountain View, CA (US); Aleksandr Movshovich, Santa Clara, CA (US); Brad Grossman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 583 days.

(21) Appl. No.: 10/975,744

(22) Filed: Oct. 28, 2004

(65) Prior Publication Data

US 2005/0190294 A1    Sep. 1, 2005

Related U.S. Application Data

(60) Provisional application No. 60/548,233, filed on Feb. 27, 2004.

(51) Int. Cl.
*H04N 9/475* (2006.01)
(52) U.S. Cl. ....................... 348/512; 348/516
(58) Field of Classification Search ........ 348/510–515, 348/536, 537–567, 500
See application file for complete search history.

(56) References Cited

U.S. PATENT DOCUMENTS

| | | | | |
|---|---|---|---|---|
| 4,249,211 A | * | 2/1981 | Baba et al. | 348/565 |
| 4,498,098 A | * | 2/1985 | Stell | 348/510 |
| 4,646,151 A | * | 2/1987 | Welles et al. | 348/513 |
| 6,191,821 B1 | * | 2/2001 | Kupnicki | 348/512 |

* cited by examiner

*Primary Examiner*—M. Lee
(74) *Attorney, Agent, or Firm*—McAndrews, Held & Malloy, Ltd.

(57) ABSTRACT

In a method and system for component sync detection and alignment, the Y/G channel is used as a master channel from which the vertical and the horizontal syncs are detected by a master sync generator. The master sync generator determines a fast and slow slice level for generating a rough and a fractional detection of the vertical sync and the horizontal sync and also generates a master sync timing window signal. A slave sync generator aligns the Pb/B and Pr/R channels to the Y/G channel by making use of the vertical, horizontal, and timing window sync signals produced by the master sync generator and by generating a slave slice level to detect the vertical and horizontal syncs in the slave channels. Positional differences in the alignment between the master channel and the slave channels are determined and stored for use in subsequent frame alignment.

40 Claims, 7 Drawing Sheets

METHOD AND SYSTEM FOR COMPONENT SYNC DETECTION AND ALIGNMENT

CROSS-REFERENCE TO RELATED APPLICATIONS/INCORPORATION BY REFERENCE

This application makes reference to, claims priority to, and claims the benefit of: U.S. Provisional Application Ser. No. 60/548,233 filed Feb. 27, 2004.

The above referenced application is hereby incorporated herein by reference in its entirety.

FIELD OF THE INVENTION

Certain embodiments of the invention relate to processing video signals. More specifically, certain embodiments of the invention relate to a method and system for component sync detection and alignment.

BACKGROUND OF THE INVENTION

In video system applications, a picture is displayed on a television or computer screen by scanning an electrical signal horizontally across the screen one line at a time. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of all the lines that make up the image or picture and all the associated synchronization (sync) signals that allow the scanning circuit to trace the lines from left to right and from top to bottom.

There may be two different types of picture scanning in a video system. For some television signals, the scanning may be interlaced, while for some computer signals the scanning may be progressive or non-interlaced. Interlaced scanning occurs when each frame is divided into two separate, but temporally coherent, sub-pictures or fields. The interlaced picture may be produced by first scanning the horizontal lines for the first field and then retracing to the top of the screen and then scanning the horizontal lines for the second field. The progressive or non-interlaced picture may be produced by scanning all of the horizontal lines of a frame in one pass from top to bottom.

The portion of the frame that represents a horizontal line scan may have an active video portion and a horizontal blanking portion. The active video portion may contain brightness and color information for the horizontal line while the horizontal blanking portion may contain a horizontal sync signal. The horizontal blanking portion is displayed as black and is not seen on the screen while the scanning circuit retraces to the starting point of the line on the screen. Similarly, a frame may have a portion of the video signal represent a vertical blanking portion. The vertical blanking portion may contain a vertical sync signal and is displayed as black and is not seen while the scanning circuit retraces from the bottom to the top of the screen in order to start a new field or frame.

The video signal displayed in the active portion of the horizontal line scan may contain red (R), green (G), and blue (B) video components to represent a point on the line. In some instances, it may be preferable to convert the R, G, and B video components to a different set of color coordinates in order to reduce the amount of color information in the video signal. Transformation to a different color coordinate with reduced color information may be possible because of the poor color acuity of the human vision system. In component analog video, for example, it may be preferable to represent a picture by its luma (Y) and its color difference components Pb and Pr than by its R, G, and B video components because of limitations in transmission bandwidth.

Component video signals, in certain configurations, may have three independent sync signals, where each one corresponds to a different color component. In most instances, a video decoder unit is adapted to ignore two of those independent signals and select one for synchronizing the horizontal and vertical blanking of all color components in the video signal. The video channel carrying the Y color component or the G color component may be used as reference for synchronization because most of the color information in a video signal is in one of these color components. However, the quality of the displayed picture suffers due to the misalignment that occurs as a result of inadvertence or other failure to incorporate the sync information contained in the two additional component video signals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for component sync detection and alignment. Detection and proper alignment of the horizontal and the vertical sync signals in the color components channels of a video signal may result in a significant improvement in picture quality. Aspects of the method may comprise detecting at least one master or reference sync signal from either the Y or G (Y/G) video channel. Detection of the master sync signal may comprise detecting a horizontal and/or a vertical sync signal in the master channel based on a comparison between a master slice level and a video signal received by the master channel. The master slice level may be determined from at least one video signal received by the master channel. The horizontal and vertical sync signals in the master channel may be detected using a rough analysis and/or a fractional analysis. The fractional analysis may be performed using a signal correlation technique. A master sync timing window signal may be generated based on the detection of the horizontal and vertical sync signals in the master channel.

A slave sync signal may be detected based on a slave slice level, the master sync timing window signal, and a video signal received by the slave video channel being detected. More than one slave video channel may be detected at once. The slave slice level may be determined from the horizontal and vertical sync signals in the master channel and at least one video signal received by the slave channel. Detection of the slave sync signal may comprise detecting a horizontal and/or a vertical sync signal in the slave channel. The slave channel selected for detection may be the Pb or B (Pb/B) video channel and/or the Pr or R (Pr/R) video channel. The horizontal and vertical sync signals in the slave channel may be detected using a rough analysis and/or a fractional analysis. The fractional analysis may be performed using a signal correlation technique.

The horizontal and vertical sync signals in the slave channel and the master channel may be used to determine a positional difference value between the channels. The positional difference value may be used to align the position of a horizontal line scan in the slave channel to the position of a corresponding horizontal line scan in the master channel. The positional difference value may be used to align a video field and/or frame in the slave channel to a corresponding video field and/or frame in the master channel. Subsequent video fields and/or frames may be aligned based on positional difference values stored from previous video fields and/or frames.

Another embodiment of the invention may provide a machine-readable storage, having stored thereon, a computer program having at least one code section executable by a machine, thereby causing the machine to perform the steps as described above for component sync detection and alignment.

Aspects of the system may comprise a master sync generator that detects at least one master or reference sync signal from either the Y or G (Y/G) video channel. Detection of the master sync signal by the master sync generator may comprise detecting a horizontal and/or a vertical sync signal in the master channel based on a comparison between a master slice level and a video signal received by the master channel. The master slice level may be determined by the master sync generator from at least one video signal received by the master channel. The master sync generator may detect the horizontal and vertical sync signals in the master channel by using a rough analysis and/or a fractional analysis. The fractional analysis may be performed using a fractional sync identifier. The master sync generator may generate a master sync timing window signal based on the detection of the horizontal and vertical sync signals in the master channel.

A slave sync generator may detect a slave sync signal based on a slave slice level, the master sync timing window signal, and a video signal received by the slave video channel being detected. More than one slave video channel may be detected by the slave sync generator at once. The slave slice level may be determined by the slave sync generator from the horizontal and vertical sync signals in the master channel and at least one video signal received by the slave channel. Detection of the slave sync signal by the slave sync generator may comprise detecting a horizontal and/or a vertical sync signal in the slave channel. A processor may select a slave channel for detection from the Pb or B (Pb/B) video channel and/or the Pr or R (Pr/R) video channel. The horizontal sync signal in the slave channel may be detected by the slave sync generator by using a rough analysis and/or a fractional analysis. The fractional sync identifier may be used to perform the fractional analysis in the slave channel.

The slave sync generator may use the horizontal and vertical sync signals in the slave and the master channels to determine a positional difference value between the channels. The positional difference value may be used by the slave sync generator to align the position of a horizontal line scan in the slave channel to the position of a corresponding horizontal line scan in the master channel. The slave sync generator may use the positional difference value to align a video field and/or frame in the slave channel to a corresponding video field and/or frame in the master channel. Subsequent video fields and/or frames may be aligned by the slave sync generator based on positional difference values stored in a memory from previous video fields and/or frames.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for component sync detection and alignment. Detection and proper alignment of the horizontal and the vertical sync signals in the color components channels of a video signal may result in a significant improvement in picture quality. Aspects of the method may comprise detecting a horizontal and/or a vertical sync signal from either the Y or G (Y/G) video channel based on a comparison between a master slice level and a video signal received by the master channel. A rough analysis and/or a fractional analysis may be used for detection. A master sync timing window signal may be generated based on the detection.

A horizontal and a vertical sync signals may be detected in a slave channel based on a slave slice level, the master sync timing window signal, and a video signal received by the slave video channel being detected. The horizontal and vertical sync signals in the slave channel and the master channel may be used to determine a positional difference value between the channels. The positional difference value may be used to align the position of a horizontal line scan in the slave channel to the position of a corresponding horizontal line scan in the master channel. The positional difference value may be used to align a video field and/or frame in the slave channel to a corresponding video field and/or frame in the master channel. Subsequent video fields and/or frames may be aligned based on positional difference values stored from previous video fields and/or frames.

Figure 1:
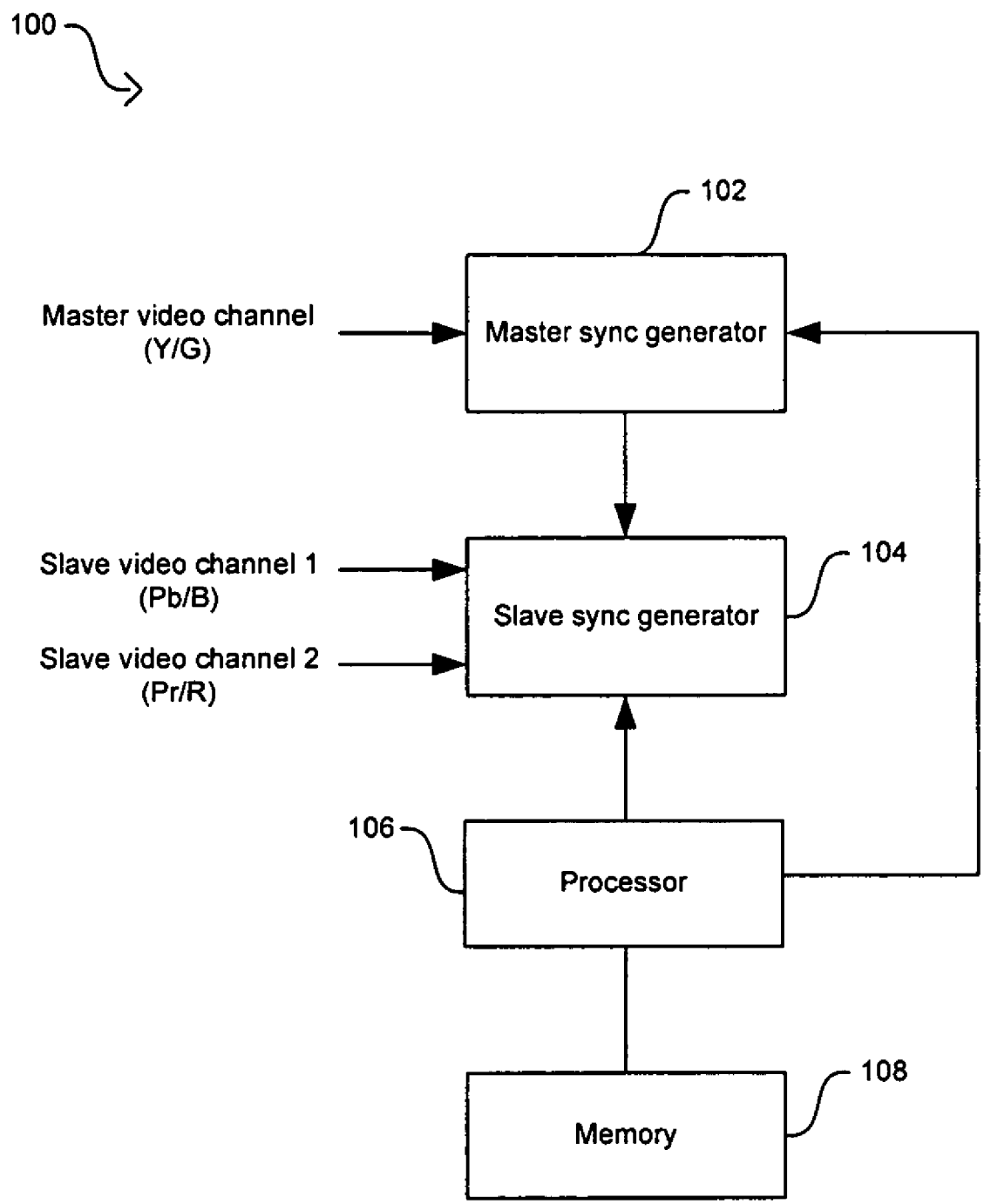
FIG. 1 is a diagram illustrating a system for video component sync detection and alignment, in accordance with an embodiment of the invention.

FIG. 1 is a diagram illustrating a system for video component sync detection and alignment, in accordance with an embodiment of the invention. Referring to FIG. 1, the component sync detection and alignment system 100 may comprise a master sync generator 102, a slave sync generator 104, a processor 106, and a memory 108.

Referring to FIG. 1, the processor 106 may comprise suitable logic, code, and/or circuitry and may be adapted to control the operation of the component sync detection and alignment system 100. In operation, the processor 106 may transfer control information and/or data to and from the master sync generator 102, the slave sync generator 104, and the memory 108 and may update registers and/or other control units to modify the operation of the master sync generator 102 and the slave sync generator 104. The memory 108 may comprise suitable logic, code, and/or circuitry and may be adapted to store control information and/or data related to the operation of the component sync detection and alignment system 100.

Figure 2:
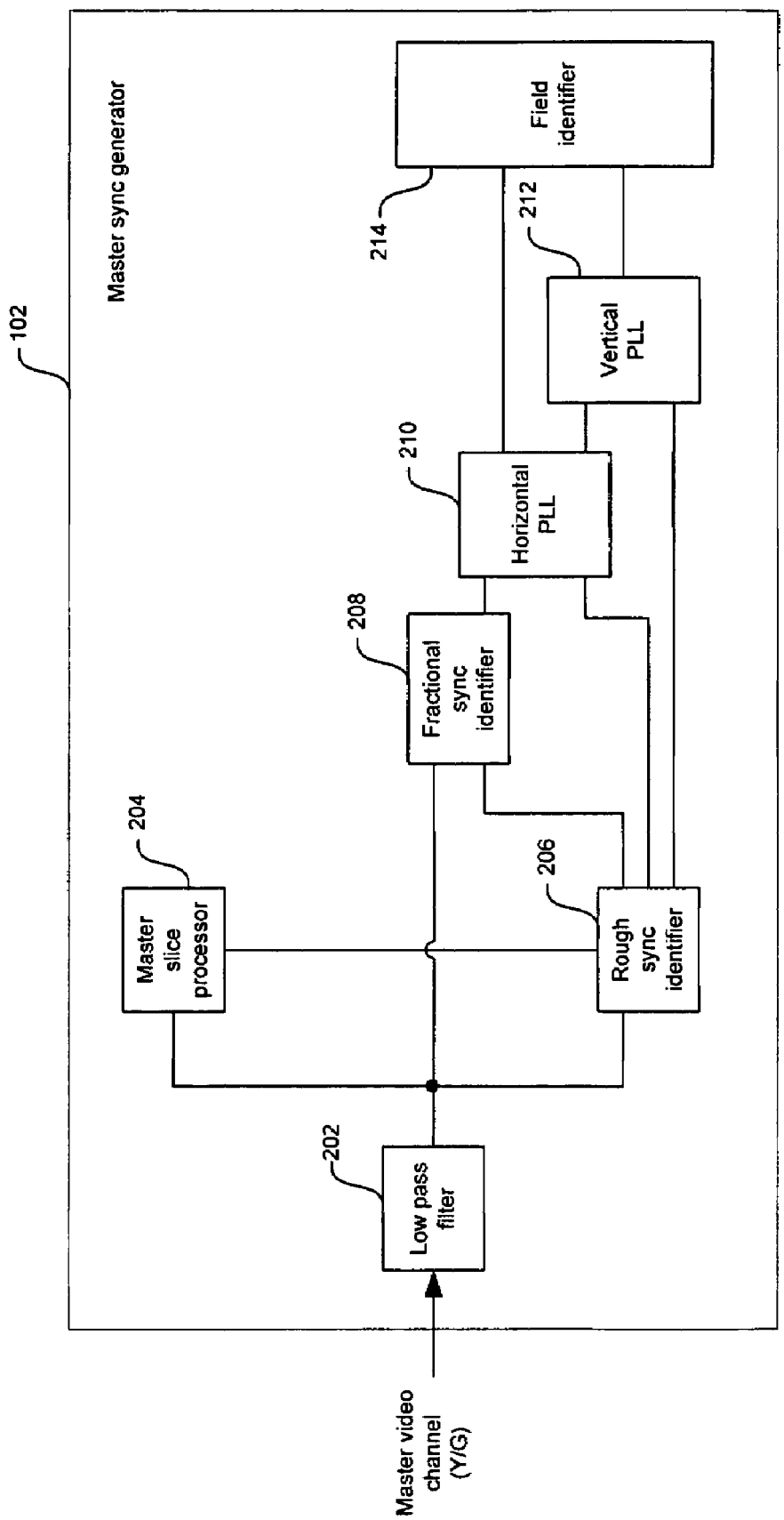
FIG. 2 is a diagram illustrating a master sync generator that may be utilized for sync detection and alignment, in accordance with an embodiment of the invention.

FIG. 2 is a diagram illustrating a master sync generator that may be utilized for sync detection and alignment, in accordance with an embodiment of the invention. The master sync generator 102 may comprise a low pass filter 202, a master slice processor 204, a rough sync identifier 206, a fractional sync identifier 208, a horizontal PLL 210, a vertical PLL 212, and a field identifier 214. The low pass filter 202 may comprise suitable logic, code, and/or circuitry and may be adapted to filter noise from an incoming video signal in the Y/G or master video channel. The master slice processor 204 may comprise suitable logic, code, and/or circuitry and may be adapted to determine a fast master slice level, a slow master slice level, and/or a sync level from at least one horizontal scan line in the Y/G video channel. The rough sync identifier 206 may comprise suitable logic, code, and/or circuitry and may be adapted to detect and generate a rough master horizontal sync and a rough master vertical sync. The fractional sync identifier 208 may comprise suitable logic, code, and/or circuitry and may be adapted to detect and generate a sub-pixel master horizontal sync. The horizontal PLL 210 may comprise suitable logic, code, and/or circuitry and may be adapted to adjust the frequency of the rough and the sub-pixel master horizontal sync signals. The vertical PLL 212 may comprise suitable logic, code, and/or circuitry and may be adapted to adjust the frequency of the rough and the sub-pixel master vertical sync signals. The field identifier 214 may comprise suitable logic, code, and/or circuitry and may be adapted to adjust a pixel count, adjust the horizontal scan line, identify a vertical blanking region, determine a sample/frame count, and identify the current field.

Figure 3A:
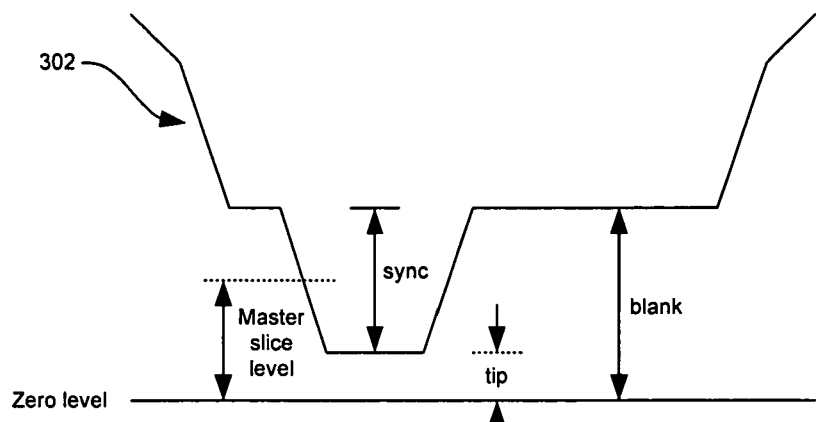
FIGS. 3A-3C illustrate exemplary timing diagrams for master slice level and sync computation, in accordance with an embodiment of the invention.
Figure 3B:
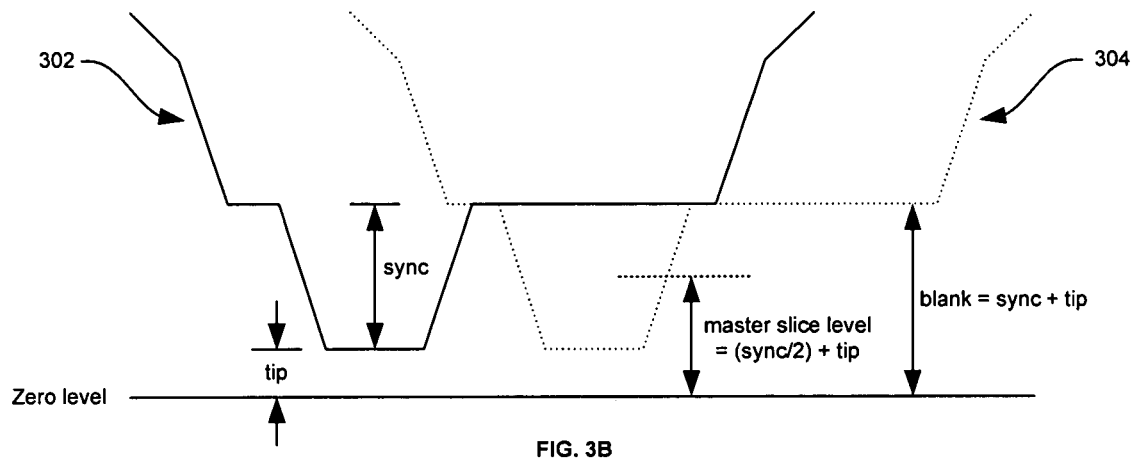
Figure 3C:
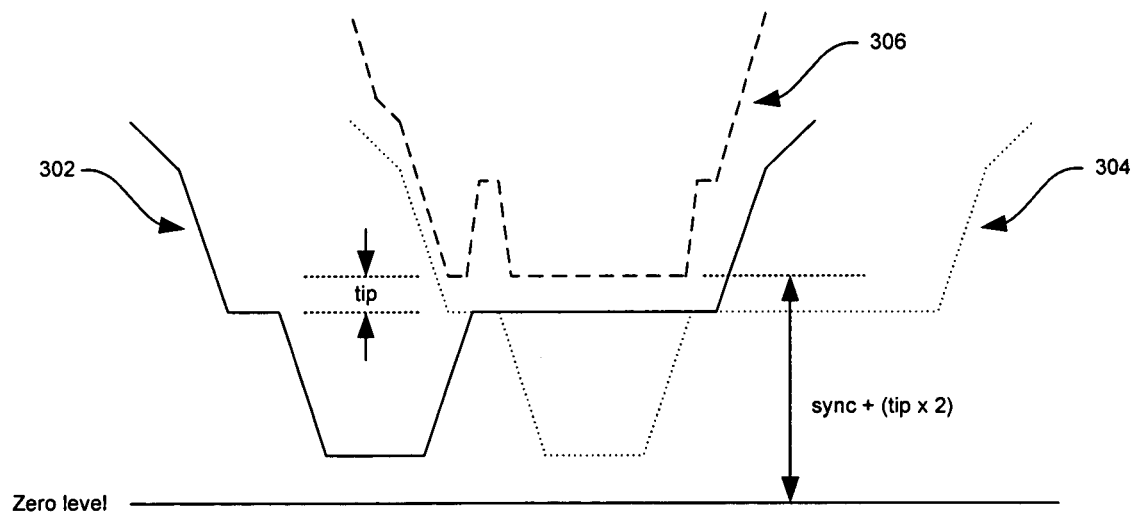

FIGS. 3A-3C illustrate exemplary timing diagrams for master slice level and sync computation, in accordance with an embodiment of the invention. Referring to FIG. 3A, a video signal 302 may be received by the master slice processor 204 to determine the master slice level. The video signal 302 may have a sync level, a tip level, and a blank level. The master slice level may be the midpoint between the tip level and the blank level. The video signal 302 may be averaged to produce a more accurate determination of the master slice level by limiting the effect of noise. Referring to FIG. 3B, the master slice processor 204 may determine the master slice level by first determining a delayed video signal 304 which may be a delayed version of the video signal 302. The delay applied to the video signal 302 to obtain the delayed video signal 304 may be slightly longer than the width of the horizontal sync pulse in the video signal 302. The number of required delay elements may be reduced based on the averaging of the video signal 302. The delay used to obtain delayed video signal 304 may be programmable and may allow the component sync detection and alignment system 100 to adjust to different video formats.

Referring to FIG. 3C, the master slice processor 204 may determine the added video signal 306 by adding the video signal 302 and the delayed video signal 304. The local minimum of the added video signal 306 is equal to sync level+(tip level×2). The tip level is the local minimum of the video signal 302 or the local minimum of the delayed video signal 304. The sync level is equal to the local minimum of the added video signal 306 minus twice the local minimum of the video signal 302 or the local minimum of the delayed video signal 304. The master slice processor 204 may divide the local minimum of the added video signal 306 by 2 to determine a fast master slice level that is equal to (sync level)/2+tip level, where both the sync level and the tip level may be determined as described above. A slow master slice level may be determined by the master slice processor 204 by passing the fast master slice level through a low pass filter.

Figure 4:
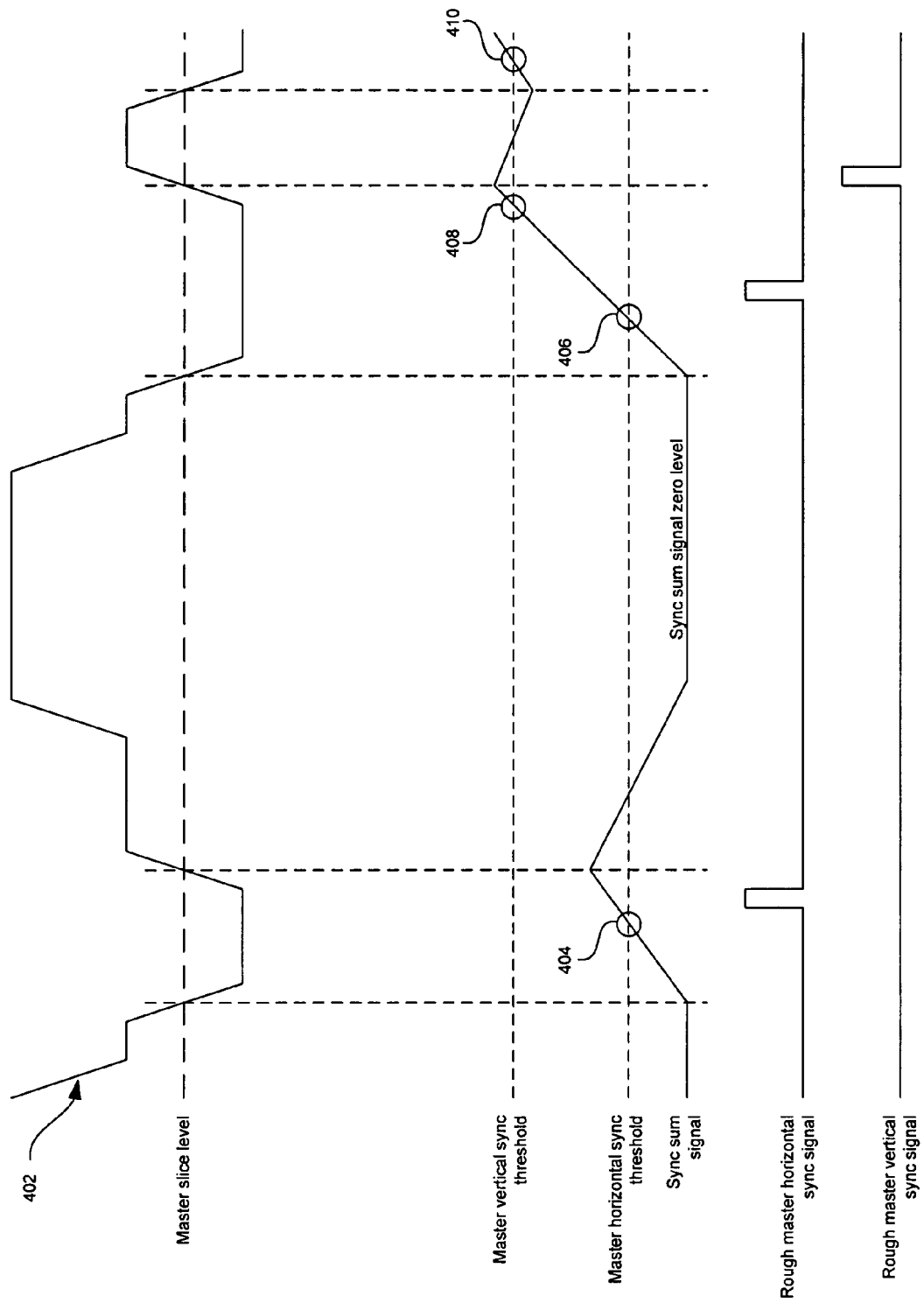
FIG. 4 is an exemplary timing diagram that illustrates the detection of rough vertical and horizontal syncs in the Y/G video channel, in accordance with an embodiment of the invention.

FIG. 4 is an exemplary timing diagram that illustrates the detection of rough vertical and horizontal syncs in the Y/G video channel, in accordance with an embodiment of the invention. Referring to FIG. 4, the rough sync identifier 206 (FIG. 2) may detect or identify a rough master horizontal sync and a rough master vertical sync from the video signal 402. The rough sync identifier 206 may track the video signal 402 and determine when it may dip below or above the master slice level. The master slice level may be a fast master slice level or a slow master slice level. The rough sync identifier 206 may determine a value corresponding to whether the video signal is below or above the master slice level and may accumulate this value in a sync sum signal. For example, the sync sum signal may be incremented or decremented for each video signal sample that is above or below the master slice level respectively.

A master horizontal sync threshold and a master vertical sync threshold may be programmed into the rough sync identifier 206 (FIG. 2) by the processor 106 to detect the presence of a master sync signal in the video signal 402. When the sync sum signal exceeds the master horizontal sync threshold, the rough sync identifier 206 may generate a master rough horizontal sync signal. Similarly, when the sync sum signal exceeds the master vertical sync threshold, the rough sync identifier 206 may generate a master rough vertical sync signal. In the illustrative example of FIG. 4, the sync sum signal may need to return to a zero level before the rough sync identifier 206 may generate another sync signal. For example, when the sync sum signal exceeds the master horizontal sync threshold at point 404, the rough sync identifier 206 may generate a master horizontal sync signal. The sync sum signal returns to zero before it exceeds the master horizontal sync threshold again at point 406. In this instance, the rough sync identifier 206 may also generate a master horizontal sync signal. When the sync sum signal exceeds the master vertical sync threshold at point 408, the rough sync identifier 206 may generate a master vertical sync signal. However, because the sync sum signal did not return to zero before exceeding the master vertical sync threshold again at point 410, the rough sync identifier 206 may not generate a master vertical sync signal.

The rough sync identifier 206 (FIG. 2) may comprise a sync sum signal for the fast master slice level and/or a sync sum signal for the slow master slice level. The rough sync identifier 206 may start operation by using the fast master slice level first. The processor 106 (FIG. 1) may monitor the number of rough master vertical sync signals generated by the rough sync identifier 206 using the slow master slice level. The processor 106 may determine after a number of rough master vertical sync signals are generated that the slow master slice level has stabilized and that it is safe to use this noise-tolerant slice level instead of the fast master slice level. Selection of the fast master slice level and/or slow master slice level may be fully programmable by setting the appropriate registers on the rough sync identifier 206. For example, the rough sync identifier 206 may be programmed to always operate using the fast master slice level.

Figure 5:
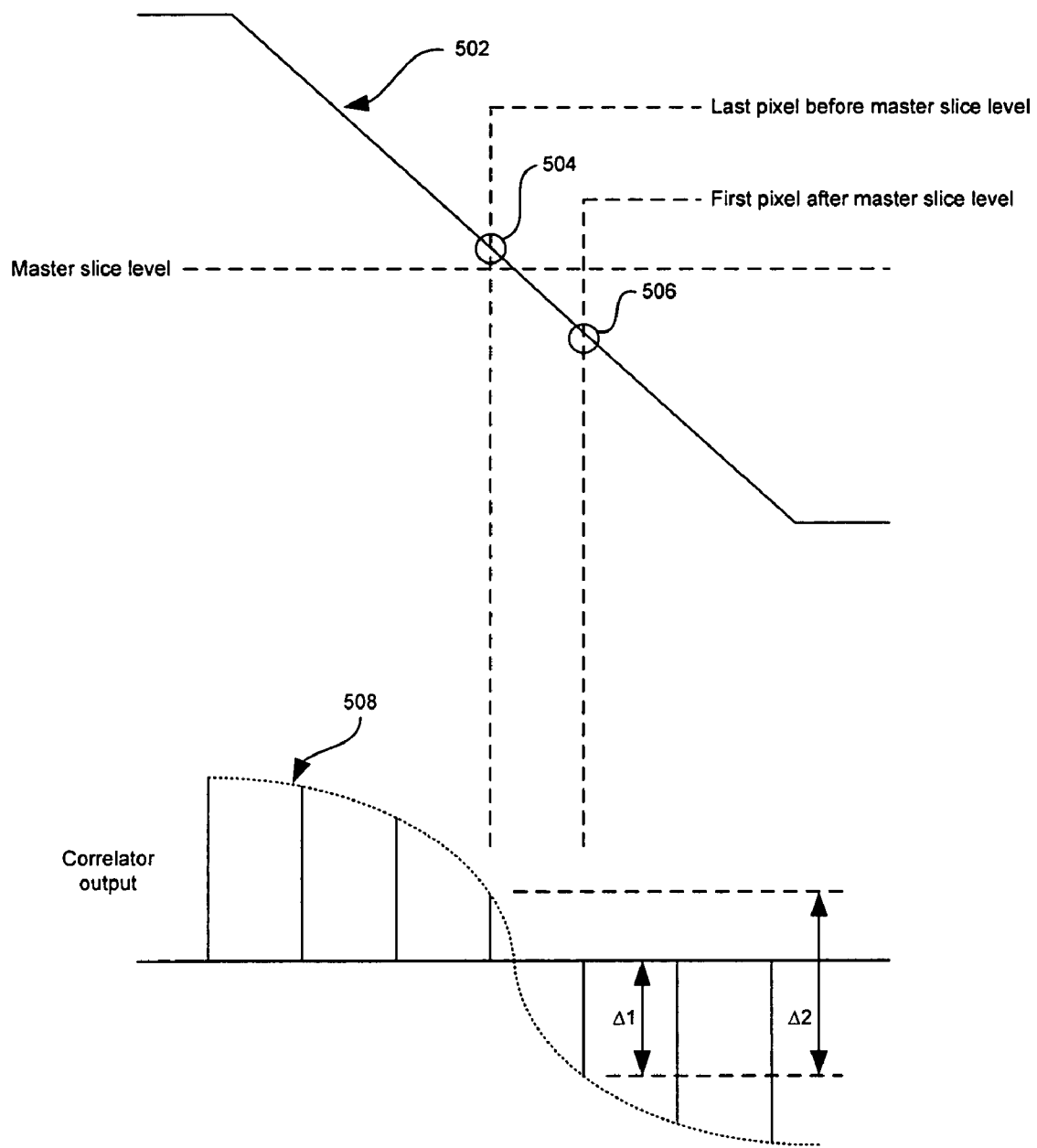
FIG. 5 is an exemplary timing diagram that illustrates the detection of fractional syncs by a correlation technique in the Y/G video channel, in accordance with an embodiment of the invention.

FIG. 5 is an exemplary timing diagram that illustrates the detection of fractional syncs by a correlation technique in the Y/G video channel, in accordance with an embodiment of the invention. Referring to FIG. 5, in operation, the fractional sync identifier 208 may detect a sub-pixel position of a sync signal in video signal 502 by finding the fractional changes between two video signal samples. The video signal 502 may be compared to the master slice level and the result of this comparison may be passed through a correlation filter.

For example, point 504 corresponds to the value of video signal 502 at the time when a pixel is sampled in the horizontal scan line. The pixel sampled at point 504 is the last pixel before the video signal 502 drops below the master slice level. Point 506 corresponds to the value of the video signal 502 at the time when the next pixel is sampled in the horizontal scan line. The pixel sampled at point 506 is the first pixel after the video signal 502 drops below the master slice level. Passing the difference between the video signal 502 and the master slice level at all sampled points through the correlation filter may produce a correlation envelope 508. The correlation envelope 508 is zero when the video signal 502 and the master slice level are the same. The time interval between the sampling of the last pixel before the video signal 502 dropped below the master slice level and the sampling of the first pixel after the video signal 502 dropped below the master slice level is known. The fractional sync identifier 208 may determine the time instant when the correlation envelope 508 is zero by comparing $\Delta 1$ and $\Delta 2$ in FIG. 4. The fractional sync identifier 208 may determine a fractional position that corresponds to the percentage change dedicated to going below the master slice level as $(\Delta 2-\Delta 1)/\Delta 2$. The fractional sync identifier 208 may determine a fractional position for a master horizontal sync signal and/or for a master vertical sync signal.

In operation, the horizontal PLL 210 may consist of an oscillator that may generate master horizontal sync signals based on a frequency generated by the horizontal PLL 210. When the oscillator exceeds the frequency, the phase may be adjusted by deleting an amount equivalent to the frequency and a master horizontal sync signal may be sent. If a rough master horizontal sync signal is provided to the horizontal PLL 210, the amount of phase error, including fractional difference, is noted and sent to adjust the frequency. The frequency may be adjusted through a combination of the expected frequency, which may be specified in a register in the horizontal PLL 210, the result of a low pass filter of an error history, and an error accumulator. The horizontal PLL 210 may allow the user to adjust the low pass filter coefficients as well as the weighting of a low pass error and an accumulator error.

In operation, the vertical PLL 212 may consist of an oscillator that may generate master vertical sync signals based on a frequency generated by the horizontal PLL 210. When the oscillator exceeds the frequency, the phase may be adjusted by deleting an amount equivalent to the frequency and a master vertical sync signal may be sent. If a rough master vertical sync signal is provided to the vertical PLL 212, the amount of phase error, including fractional difference, is noted and sent to adjust the frequency. The frequency may be adjusted through a combination of the expected frequency, which may be specified in a register in the vertical PLL 212, the result of a low pass filter of an error history, and an error accumulator. The vertical PLL 212 may allow the user to adjust the low pass filter coefficients as well as the weighting of a low pass error and an accumulator error.

In operation, the field identifier 214 may adjust a pixel or sample count by compensating for the delay corresponding to the time it takes the sync sum signal in the rough sync identifier 206 to cross a threshold. The field identifier 214 may adjust the position of a horizontal scan line to account for the fact that the rough master vertical sync signal does not occur on line 0. The horizontal scan line position may be compensated by a programmable offset in the field identifier 214 to reflect the fact that it may occur in either line 1 or in line 4. The field identifier 214 may determine when a current horizontal scan line may be in the range of the specified vertical blanking region. The field identifier 214 may determine a sum of the number of pixel samples, including sync level and video samples, in the previous frame. The field identifier 214 may compare the pixel position to the horizontal scan line length at each PLL-generated master vertical sync signal to determine a raw field ID of whether the new field is odd or even. The raw field ID may be stored in a register or other memory which may contain previously stored raw field IDs. The stored raw field IDs may be used by the field identifier 214 to determine whether the video signal is interlaced or progressive. If the video signal is interlaced, the stored raw field IDs may be evaluated to determine the current field.

Figure 6:
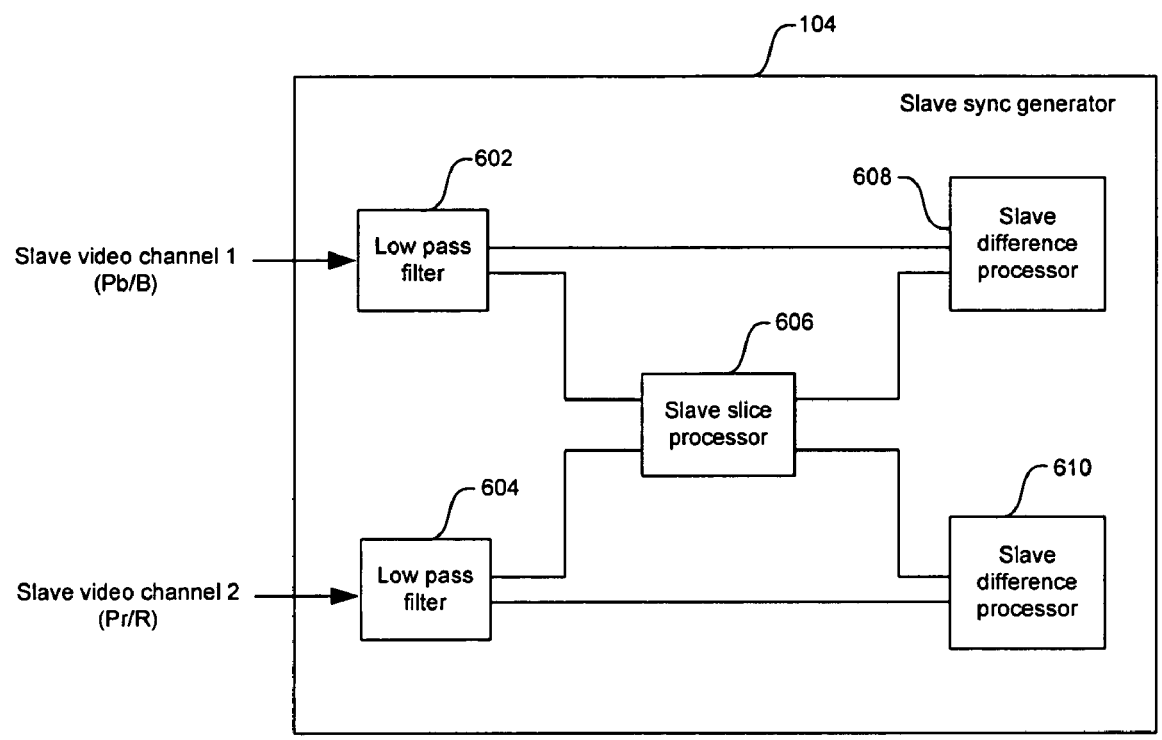
FIG. 6 is a diagram illustrating a slave sync generator that may be utilized for sync detection and alignment, in accordance with an embodiment of the invention.

FIG. 6 is a diagram illustrating a slave sync generator that may be utilized for sync detection and alignment, in accordance with an embodiment of the invention. Referring to FIG. 6, the slave sync generator 104 may comprise a low pass filter 602, 604, a slave slice processor 606, a slave difference processor 608, and a slave difference processor 610. The slave sync generator 104 may determine the sync signals for the Pb/B and/or Pr/R video channels by making use of the fact that the sync signals should be roughly aligned with corresponding sync signals on the Y/G video channel. The low pass filter 602 may comprise suitable logic, code, and/or circuitry and may be adapted to filter noise from an incoming video signal in the Pb/B or a slave video channel. The low pass filter 604 may comprise suitable logic, code, and/or circuitry and may be adapted to filter noise from an incoming video signal in the Pr/R or a slave video channel. The slave slice processor 606 may comprise suitable logic, code, and/or circuitry and may be adapted to determine a slave slice level to be used with the Pb/B video channel and a slave slice level to be used with the Pr/R video channel. The slave difference processor 708 may comprise suitable logic, code, and/or circuitry and may be adapted to determine a positional difference value and to align the Pb/B video channel and the master video channel. The slave difference processor 610 may comprise suitable logic, code, and/or circuitry and may be adapted to determine a positional difference value and to align the Pr/R video channel and the master video channel.

Figure 7A:
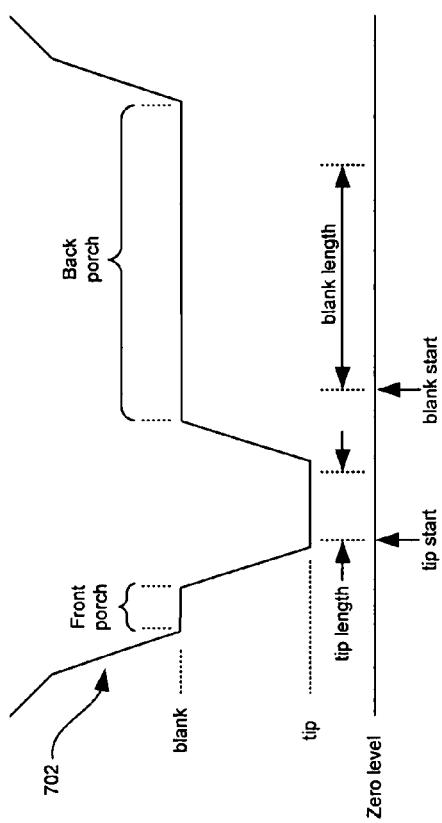
FIGS. 7A-7B illustrate exemplary timing diagrams for determining a slave slice level and for sync detection in a slave video channel, in accordance with an embodiment of the invention.
Figure 7B:
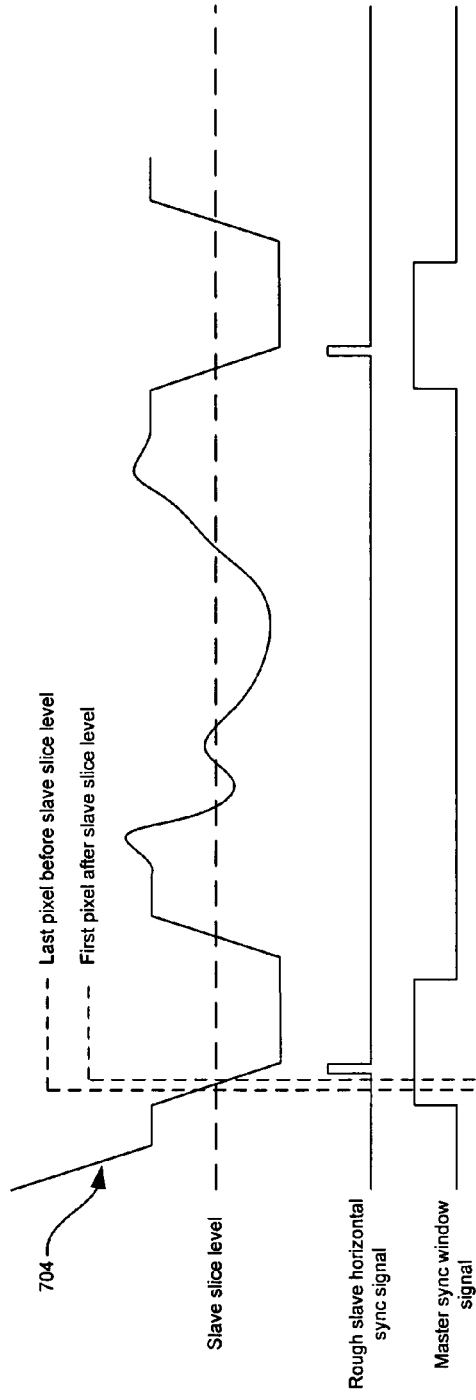

FIGS. 7A-7B illustrate exemplary timing diagrams for determining a slave slice level and for sync detection in a slave video channel, in accordance with an embodiment of the invention. Referring to FIG. 7A, in operation, the slave slice processor 606 may receive from the master sync generator 102 the relative raster or scanning position to determine regions where samples of the video signal 702 may be averaged in order to determine the slave slice level. The slave slice processor 606 (FIG. 6) may average at least one sample of the video signal 702 starting at a tip start and finishing at the end of a tip length. The slave slice processor 606 may average at least one sample during the back porch of the video signal 702 starting at a blank start and finishing at the end of a blank length. The number of samples to average for the tip level and the blank level may be specified through register settings in the slave sync generator 102 (FIG. 1) which may indicate a proper pixel count to start and a number of samples to average. The slave slice level is equal to (blank level+tip level)/2. The slave slice level determined by the slave slice processor 606 may be passed through a low pass filter to stabilize the tip level and the blank level. Moreover, a vertical blanking signal from the master sync generator 102 may be used to disable the determination of the slave slice level during serration and equalization pulses in the slave slice processor 606. The slave slice level determined by the slave slice processor 606 may be used to detect a slave horizontal sync signal and/or a slave vertical sync signal.

Referring to FIG. 7B, in operation, the slave difference processor 608, 610 may report the positional difference or the alignment necessary between the sync signals in their corresponding slave video channels and the master sync signals position predicted by the horizontal PLL 210 (FIG. 2) and the vertical PLL 212 in the master sync generator 102 (FIG. 1). A rough positional difference is determined by the slave difference processor 608, 610 by identifying the current pixel relative to the horizontal scan line length in the master sync generator 102 when the video signal 704 drops below the slave slice level. Because the active video portion of the video signal 704 in the Pb/B and/or Pr/R video channels may also drop below the slave slice level, information regarding a useful region or window of detection may be transferred from the master sync generator 102 to the slave difference processor 608, 610. A master sync window signal may be generated based on the useful region of detection. When the video signal 704 drops below the slave slice level and the master sync window is active, a rough slave horizontal sync signal may be generated by the slave difference processor 608, 610. The rough slave horizontal sync signal may be used to generate a rough horizontal positional difference between the slave video channels and the master video channel. Similarly, when the video signal 704 drops below the slave slice level during a vertical sync event and the master sync window is active, a rough slave vertical sync signal may be generated by the slave difference processor 608, 610. The rough slave vertical sync signal may be used to generate a rough vertical positional difference between the slave video channels and the master video channel. The rough horizontal positional difference and rough vertical positional difference may be adjusted to account for the sub-pixel or fractional position of the sync. The sub-pixel or fractional positional difference may be determined by the fractional sync identifier 208 (FIG. 2) or may be determined by suitable logic, code, and/or circuitry in the slave difference processor 608, 610, the slave sync generator 104, and/or the processor 106, which may be adapted to determine the sub-pixel or fractional positional difference. The rough and fractional positional difference values may be reported using programmable signed-integer and fractional values.

The positional difference values may be averaged in the slave difference processor 608, 610. This is intended to determine the average positional difference found in a video field. Which horizontal scan lines have their positional difference averaged may be programmed into the slave difference processor 608, 610 by, for example, specifying a starting line and the number of subsequent lines. This average positional difference value may be stored in the slave difference processor 608, 610 and/or in the memory 108 for use in with a subsequent field. A video field positional difference may be determined from the average positional difference and prior rough positional differences. The average positional difference provides a consistent, corrective positional difference for an entire frame or field. To adjust the picture line-by-line, the average positional difference may be adjusted by using the sub-pixel sync information generated by the master sync generator 102. This adjustment may change the integer, for example, in the case of a roll over, and the fractional values of the current average positional difference.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
   detecting at least one master sync signal based on at least one master slice level and at least one of a plurality of video signals received by a master video channel;
   generating at least one master sync timing window signal based on said detected at least one master sync signal;
   detecting at least one slave sync signal based on at least one slave slice level, at least one of said generated at least least one master sync timing window signal, and at least one of a plurality of video signals received by at least one of a plurality of slave video channels; and aligning said master video channel and said at least one of a plurality of slave video channels based on at least one of said detected at least one master sync signal and at least one of said detected at least one slave sync signal.

2. The method according to claim 1, comprising selecting a Y/G video channel as said master video channel.

3. The method according to claim 1, comprising selecting said at least one of a plurality of slave video channels from a Pb/B video channel and a Pr/R video channel.

4. The method according to claim 1, wherein said detected at least one master sync signal is a master horizontal sync signal and a master vertical sync signal.

5. The method according to claim 1, wherein said detected at least one slave sync signal a slave horizontal sync signal and a slave vertical sync signal.

6. The method according to claim 1, comprising detecting said at least one master sync signal and said at least one slave sync signal based on a rough detection analysis.

7. The method according to claim 1, comprising detecting said at least one master sync signal and said at least one slave sync signal based on a fractional detection analysis.

8. The method according to claim 7, comprising determining said fractional detection analysis by a signal correlation technique.

9. The method according to claim 1, wherein said at least one master slice level is a fast master slice level.

10. The method according to claim 1, wherein said at least one master slice level is a slow master slice level.

11. The method according to claim 1, comprising disabling said at least one slave slice level during serration and equalization pulses.

12. The method according to claim 1, comprising determining a positional difference value based on at least one of said detected at least one slave sync signal and at least one of said detected at least one master sync signal.

13. The method according to claim 10, comprising storing said determined positional difference for subsequent alignments.

14. A machine-readable storage having stored thereon, a computer program having at least one code section for video signal processing, the at least one code section being executable by a machine for causing the machine to perform steps comprising:
  detecting at least one master sync signal based on at least one master slice level and at least one of a plurality of video signals received by a master video channel;
  generating at least one master sync timing window signal based on said detected at least one master sync signal;
  detecting at least one slave sync signal based on at least one slave slice level, at least one of said generated at least one master sync timing window signal, and at least one of a plurality of video signals received by at least one of a plurality of slave video channels; and
  aligning said master video channel and said at least one of a plurality of slave video channels based on at least one of said detected at least one master sync signal and at least one of said detected at least one slave sync signal.

15. The machine-readable storage according to claim 14, comprising code for selecting a Y/G video channel as said master video channel.

16. The machine-readable storage according to claim 14, comprising code for selecting said at least one of a plurality of slave video channels from a Pb/B video channel and a Pr/R video channel.

17. The machine-readable storage according to claim 14, wherein said detected at least one master sync signal is a master horizontal sync signal and a master vertical sync signal.

18. The machine-readable storage according to claim 14, wherein said detected at least one slave sync signal a slave horizontal sync signal and a slave vertical sync signal.

19. The machine-readable storage according to claim 14, comprising code for detecting said at least one master sync signal and said at least one slave sync signal based on a rough detection analysis or a fractional detection analysis.

20. The machine-readable storage according to claim 19, comprising code for determining said fractional detection analysis by a signal correlation technique.

21. The machine-readable storage according to claim 14, wherein said at least one master slice level is a fast master slice level or a slow master slice level.

22. The machine-readable storage according to claim 14, comprising code for disabling said at least one slave slice level during serration and equalization pulses.

23. The machine-readable storage according to claim 14, comprising code for determining a positional difference value based on at least one of said detected at least one slave sync signal and at least one of said detected at least one master sync signal.

24. The machine-readable storage according to claim 23, comprising code for storing said determined positional difference for subsequent alignments.

25. A system for video signal processing, the method comprising:
  a master sync generator that detects at least one master sync signal based on at least one master slice level and at least one of a plurality of video signals received by a master video channel;
  said master sync generator generates at least one master sync timing window signal based on said detected at least one master sync signal;
  a slave sync generator that detects at least one slave sync signal based on at least one slave slice level, at least one of said generated at least one master sync timing window signal, and at least one of a plurality of video signals received by at least one of a plurality of slave video channels; and
  said slave sync generator aligns said master video channel and said at least one of a plurality of slave video channels based on at least one of said detected at least one master sync signal and at least one of said detected at least one slave sync signal.

26. The system according to claim 25, wherein a processor selects a Y/G video channel as said master video channel.

27. The system according to claim 25, wherein a processor selects said at least one of a plurality of slave video channels from a Pb/B video channel and a Pr/R video channel.

28. The system according to claim 25, wherein said master sync generator detects a master horizontal sync signal and a master vertical sync signal.

29. The system according to claim 25, wherein said slave sync generator detects a slave horizontal sync signal and a slave vertical sync signal.

30. The system according to claim 25, wherein said master sync generator detects said at least one master sync signal based on a rough detection analysis or a fractional detection analysis.

31. The system according to claim 30, wherein a fractional sync identifier determines said fractional detection analysis.

32. The system according to claim 25, wherein said slave sync generator detects said at least one slave sync signal based on a rough detection analysis or a fractional detection analysis.

33. The system according to claim 32, wherein a fractional sync identifier determines said fractional detection analysis.

34. The system according to claim 25, wherein said master sync generator determines a fast master slice level or a slow master slice level.

35. The system according to claim 25, wherein said slave sync generator disables said slave slice level during serration and equalization pulses.

36. The system according to claim 25, wherein said slave sync generator determines a positional difference value based on at least one of said detected at least one slave sync signal and at least one of said detected at least one master sync signal.

37. The system according to claim 36, wherein said slave sync generator stores in a memory said determined positional difference value for subsequent alignments.

38. A video processing circuit, comprising:
a master sync generator;
a slave sync generator coupled to said master sync generator;
a processor coupled to said master sync generator and said slave sync generator; and
a memory coupled to said processor, wherein said video processing circuit is enabled to detect sync signals of a plurality of video channels, and align said channels based on said detection.

39. A sync detection and alignment circuit, comprising:
a master sync generator, a slave sync generator coupled to said master sync generator, a processor coupled to said master sync generator and said slave sync generator, and a memory coupled to said processor; and
wherein said master sync generator comprises:
a low pass filter, a master slice processor coupled to said low pass filter, a rough sync identifier coupled to said low pass filter and said master slice processor, a fractional sync identifier coupled to said low pass filter and said rough sync identifier, a horizontal PLL coupled to said fractional sync identifier and said rough sync identifier, a vertical PLL coupled to said horizontal PLL and said rough sync identifier, and a field identifier coupled to said horizontal PLL and said vertical PLL.

40. A sync detection and alignment circuit, comprising:
a master sync generator, a slave sync generator coupled to said master sync generator, a processor coupled to said master sync generator and said slave sync generator, and a memory coupled to said processor; and
wherein said slave sync generator comprises:
a first low pass filter, a slave slice processor coupled to said first low pass filter, a second low pass filter coupled to said slave slice processor, a first slave difference processor coupled to said slave slice processor and said first low pass filter, and a second slave difference processor coupled to said slave slice processor and said second low pass filter.

* * * * *